United States Patent [19]
Leveridge

[11] 3,822,476
[45] July 9, 1974

[54] FINGER AND RING MEASURING GAUGE

[75] Inventor: Athos D. Leveridge, Pompton Plains, N.J.

[73] Assignee: Athos D. Leveridge and Therese Leveridge d/b/a A. D. Leveridge, Pompton Plains, N.J.

[22] Filed: Oct. 24, 1972

[21] Appl. No.: 299,896

[52] U.S. Cl. ............ 33/143 C, 33/143 J, 33/147 T, 33/178 R
[51] Int. Cl. .......................... G01b 5/08, G01b 3/34
[58] Field of Search .......... 33/178 R, 143 R, 143 C, 33/143 M, 143 J, 143 K, 147 R, 147 T, 147 J

[56] References Cited
UNITED STATES PATENTS

| | | |
|---|---|---|
| 500,130 | 6/1893 | Hughes ............................ 33/178 R |
| 1,213,607 | 1/1917 | Engelsman ..................... 33/143 C X |
| 1,277,075 | 8/1918 | Ingalls ............................... 33/178 R |
| 1,341,865 | 6/1920 | Solberg ............................. 33/143 J |
| 1,823,045 | 9/1931 | Hommel ............................. 33/143 J |
| 3,266,159 | 8/1966 | Scholl ........................... 33/143 M X |
| 3,321,839 | 5/1967 | Muller ........................... 33/147 R X |
| 3,447,244 | 6/1969 | Scholl ............................... 33/147 T |
| 3,576,077 | 4/1971 | Moseman ......................... 33/178 R |

Primary Examiner—John W. Huckert
Assistant Examiner—Milton S. Gerstein

[57] ABSTRACT

A finger and finger ring measuring gauge comprising a casing containing the operating members for measuring and indicating the measurements of fingers and rings to be fitted thereto, characterized by combining (a) a simplicity in structure, (b) an ease of manipulation, (c) a facility in measuring and visibly indicating the finger and ring sizes measured, and (d) an attractiveness in appearance of the gauge.

3 Claims, 4 Drawing Figures

PATENTED JUL 9 1974　　　3,822,476
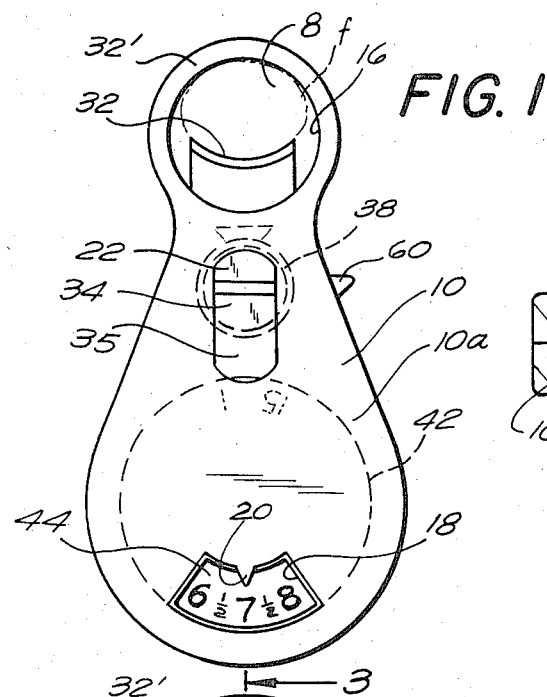
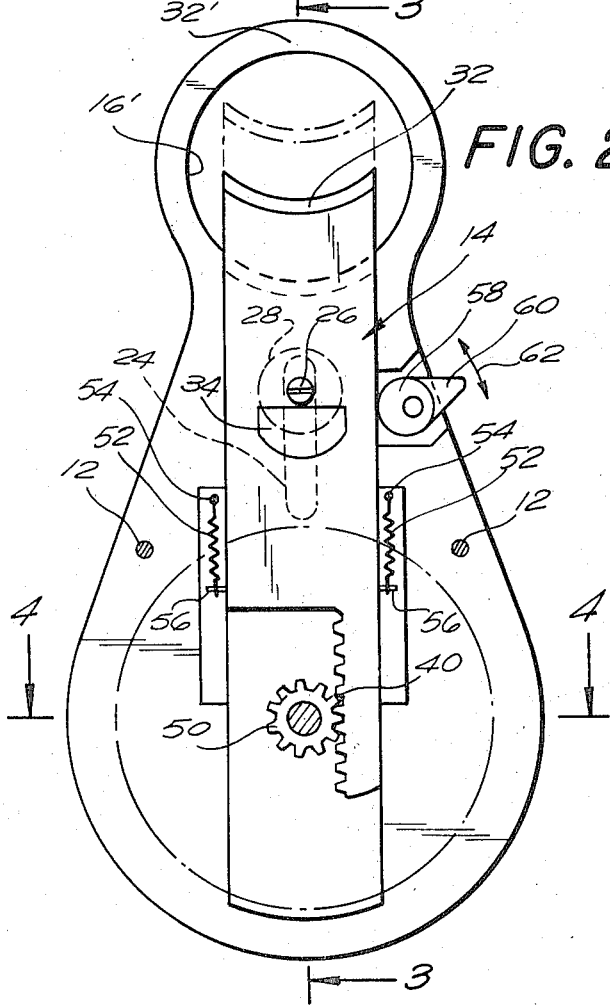
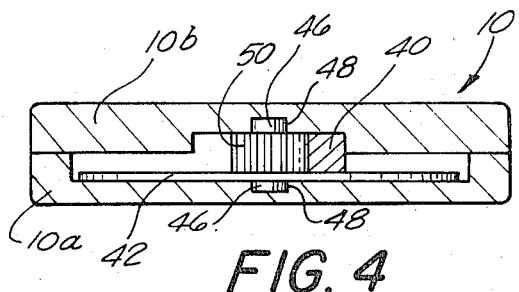
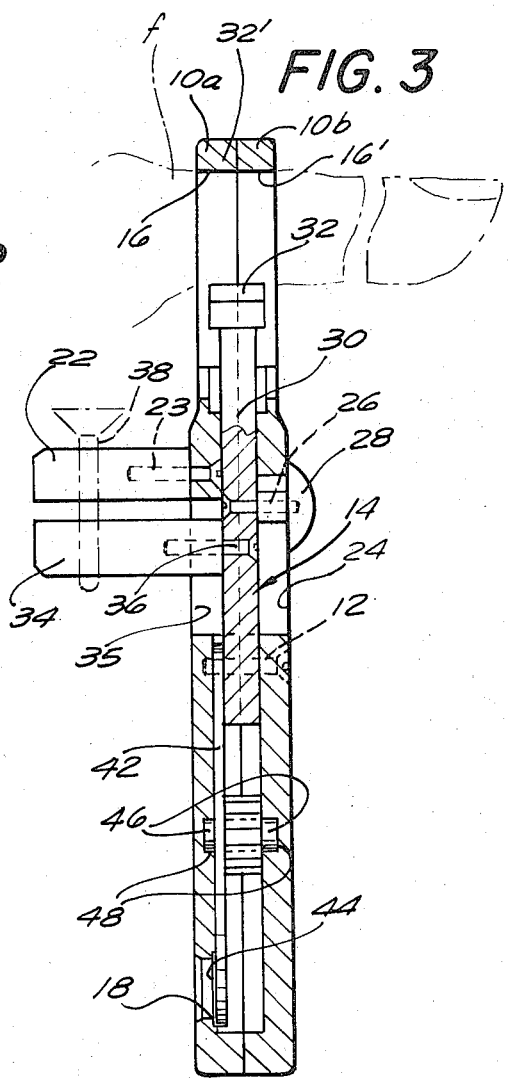
FIG. 1
FIG. 4
FIG. 3
FIG. 2

FINGER AND RING MEASURING GAUGE

This invention relates to a finger and finger ring measuring gauge.

The prime object of my present invention is the provision of a finger and finger ring measuring gauge constructed and designed for the practical measurement by jewelers or others of the fingers of persons in fitting the ring and the rapid and practical measurement of fitting ring sizes. The improved gauge of the invention is characterized by combining (a) a simplicity in structure; (b) ease of manipulation; (c) a facility in the measuring and the visually indicating of the finger and ring sizes; and (d) attractiveness in appearance of the gauge.

To the accomplishment of these objects and such other objects as may hereinafter appear, the invention relates more specifically to a finger and finger ring measuring gauge as defined in the appended claims considered with the following description and shown in the appended drawings, in which:

FIG. 1 is a front face view of the gauge shown in a position measuring the size of the finger to be fitted and measuring the fitted finger ring;

FIG. 2 is a view of the same shown to an enlarged scale with the front section of the gauge casing removed displaying the interior of the casing and also indicating in the dotted line portion the normal position of the operated parts thereof;

FIG. 3 is a cross-sectional view thereof taken in section in the plane of line 3—3 of FIG. 2; and FIG. 4 is a cross-sectional view taken in the plane of line 4—4 of FIG. 2.

Referring now more in detail to the drawings, the gauge comprises a casing generally designated as 10 made up of two sections, a front section 10(a) and a rear section 10(b) secured together by attaching members such as the screws 12, the formed casing enclosing the operating parts or members generally designated as 14.

The front casing section 10(a) is formed at its top with an opening 16 and at its bottom with an indicator viewing opening 18 provided with a pointer 20 and provided at an intermediate region with a fixed stud 22 secured thereto by a screw 23. The rear casing section 10(b) is formed at its top with an opening 16' which mates with the front casing section opening 16 to define the finger receiving aperture for the gauge as indicated by the inserted finger (f) shown (in dotted lines) in FIGS. 1 and 3 of the drawings. The rear casing section 10(b) is also formed at an intermediate region thereof with an elongated slot 24 for receiving and permitting the longitudinal movement of the core 26 of an operating button 28.

The operating or actuated parts of the gauge enclosed in the casing 10 comprises a slide member 30 longitudinally movable in a recessed part 31 of the casing, and formed at its top with an arcuate finger engaging jaw 32 movable into and from the finger receiving aperture 16, 16' for mating with the top of the finger receiving aperture, the latter defining an arcuate jaw 32'. The slide member 14 is provided at an intermediate region thereof with a stud 34 attached thereto by the screw 36, the stud, movable in a front casing section slot 35, mating with the fixed stud 22 for receiving rings to be measured by the gauge such as the ring 38 shown in dotted lines in FIGS. 1 and 3 of the drawings.

The slide member 14 is formed at its bottom with a rack 40 as shown in FIGS. 1 and 4 of the drawings.

Also mounted within the casing 10 is a circular dial 42 bearing a scale 44 (with indicia of numbers from 1 to 15) exposed at the viewing opening 18 (as best shown in FIG. 1), the said dial being rotatable on bearings 46 lodged in apertures 48 formed in the front and rear casing sections (see FIGS. 3 and 4). The said dial 42 carries or is formed integrally with a pinion 50 which meshes with the rack 40.

The slide 14 is spring biased at its opposite sides by the springs 52, 52 each anchored at one end to the casing section as at 54, 54 and at its other end to the slide member as at 56, 56.

The gauge is also provided with a member for holding or locking the slide in a measuring position, the said member comprising simply a cam lever 58 pinned to the rear casing section as shown in FIG. 2, the cam of which acts against the side of the slide member 14, the said cam lever being formed with a finger engaging part 60. The lever is movable in the direction indicated by the arrow 62 for locking and unlocking the slide member.

The use and operation of the finger measuring gauge will in the main be fully apparent from the above detailed description thereof. For finger measuring: the movable finger jaws 32, 32' are relatively in an extended (contracted) normal position, movable thereto by spring bias; for permitting insertion of a finger the slide member 14 is moved by the button 28 to a retracted position; the slide member is then released and acting under spring bias, the jaw 32 engages the finger; the slide is then held in this position by the cam lock, and the measurement is visually noted at the scale 44; upon finger disengagement, the jaw 32 retracts to its normal position under spring bias. For ring measuring: the movable ring stud 34 is in a normal contracted position movable thereto by the spring bias on the slide member; the ring is then loosely mounted on the studs 22 and 34; the movable stud 34 is moved by the operation of the button 28 to a retracted position to engage the ring (the action being under spring bias); the movable stud is held in this position by the cam lock and the measurement is noted on the scale 44; upon ring removal the stud 34 retracts to its normal position under spring bias.

With this described construction, there is provided an enclosure or casing having a form adapted to be held in the palm of one's hand, with all of the operated parts enclosed by the casing, the parts being simply controlled by the manipulation of an exposed button 28 and a readily engageable end of cam lever 58. The structure provides a desired facility in measuring and indicating the finger and ring sizes measured, visual inspection of the measurements being afforded at an enlarged viewing opening 18 at the bottom of the casing. The gauge as a whole is also attractive in appearance.

While I have disclosed the measuring gauge in a preferred structure or design, it will be apparent that changes will be made in the form of the casing and the construction of the parts without departing from the spirit of the invention as defined in the claims.

I claim:

1. A finger and finger ring measuring gauge comprising a casing having a form adapted to be held in one's hand, said casing being provided at its top end with a finger receiving aperture formed with a finger engaging jaw and at its bottom end with an indicator viewing opening, a slide member within the casing longitudinally movable therein, an indicator dial having a measuring scale thereon within the casing at its bottom end rotatably mounted therein, the scale thereon being visible through said indicator viewing opening, said dial having a pinion fixed thereto, the said slide member being provided with (a) a rack meshing with said pinion, (b) a stud fixed thereto in a medial position thereof and extending through a slot formed in the front of said casing, and (c) a finger engaging jaw at its top movable into and from said finger receiving aperture for mating with the finger engaging jaw formed in said aperture, a second stud fixed exteriorly to said casing at its front for mating with the slide fixed stud, and manually movable means attached to the slide member and extending outwardly of the casing for moving the slide member, the said mating finger engaging jaws functioning for measuring the size of fingers and said mating studs functioning for mounting and measuring finger rings.

2. The finger and finger ring measuring gauge of claim 1 wherein the gauge further comprises springs mounted within the casing and anchored to the slide member for biasing said slide member to a normal extended position with the jaws and the studs moved relatively to a contracted position, movement of the slide member by the manually movable means against the biasing action of the spring resulting in moving the jaws and the studs to a relatively retracted position.

3. The finger and finger ring measuring gauge of claim 2 wherein the gauge further comprises an exteriorly operable cam brake is arranged to engage the slide member to hold the same in finger and ring measuring positions.

* * * * *